United States Patent
McCallum et al.

(10) Patent No.: US 10,364,822 B2
(45) Date of Patent: Jul. 30, 2019

(54) BLADE FOR A VARIABLE PITCH FAN

(71) Applicant: Flexxaire Inc, Edmonton (CA)

(72) Inventors: Jonathan E. McCallum, Edmonton (CA); George Antoszko, Edmonton (CA); Peter Knight, Edmonton (CA)

(73) Assignee: FLEXXAIRE INC, Edmonton, Alberta (CA)

(*) Notice: Subject to any disclaimer, the term of this patent is extended or adjusted under 35 U.S.C. 154(b) by 407 days.

(21) Appl. No.: 15/244,404

(22) Filed: Aug. 23, 2016

(65) Prior Publication Data

US 2017/0067480 A1    Mar. 9, 2017

Related U.S. Application Data

(60) Provisional application No. 62/215,711, filed on Sep. 8, 2015.

(51) Int. Cl.
*F04D 25/08* (2006.01)
*F04D 29/36* (2006.01)
*F04D 29/38* (2006.01)

(52) U.S. Cl.
CPC .......... *F04D 29/384* (2013.01); *F04D 25/08* (2013.01); *F04D 29/362* (2013.01); *F04D 29/366* (2013.01); *F05B 2240/30* (2013.01)

(58) Field of Classification Search
CPC ........ F04D 29/34; F04D 29/325; F04D 29/36; F04D 29/362; F04D 29/38; F04D 29/366
See application file for complete search history.

(56) References Cited

U.S. PATENT DOCUMENTS

| | | | |
|---|---|---|---|
| 2,620,886 A * | 12/1952 | Turner | F04D 29/362 |
| | | | 416/144 |
| 4,154,557 A * | 5/1979 | Weiland | B64C 27/45 |
| | | | 416/134 A |
| 6,113,351 A | 9/2000 | McCallum et al. | |
| 6,253,716 B1 * | 7/2001 | Palmer | F01P 7/06 |
| | | | 123/41.12 |
| 2017/0191495 A1 * | 7/2017 | Bordoni | F02K 3/06 |

* cited by examiner

*Primary Examiner* — Igor Kershteyn
*Assistant Examiner* — Topaz L. Elliott
(74) *Attorney, Agent, or Firm* — Pedersen & Company, PLLC; Ken J. Pedersen; Barbara S. Pedersen

(57) ABSTRACT

A fan blade is mounted on a shaft or arranged to vary in pitch via rotation about a pitching axis. The fan blade is mounted with a center of mass offset from the shaft or pitching axis. This offset reduces torque around the shaft or pitching axis.

3 Claims, 7 Drawing Sheets

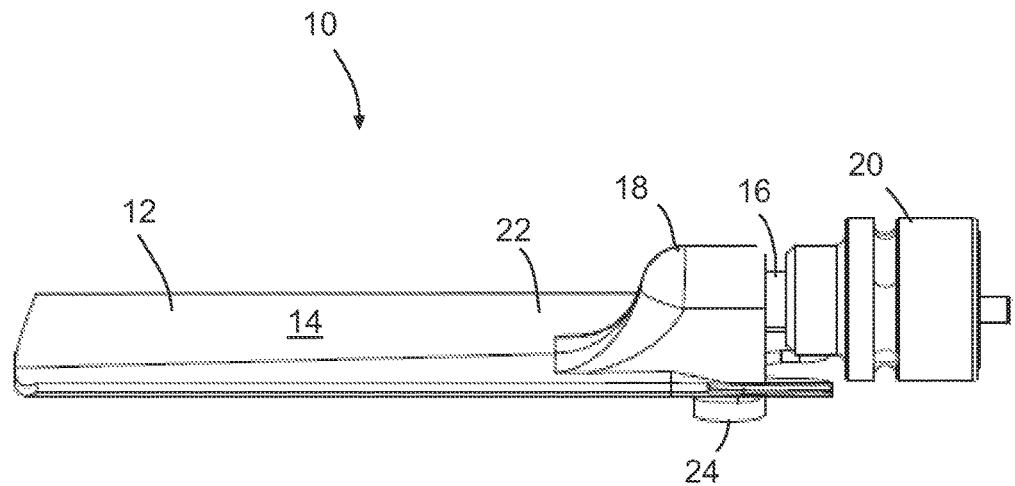
Fig. 1
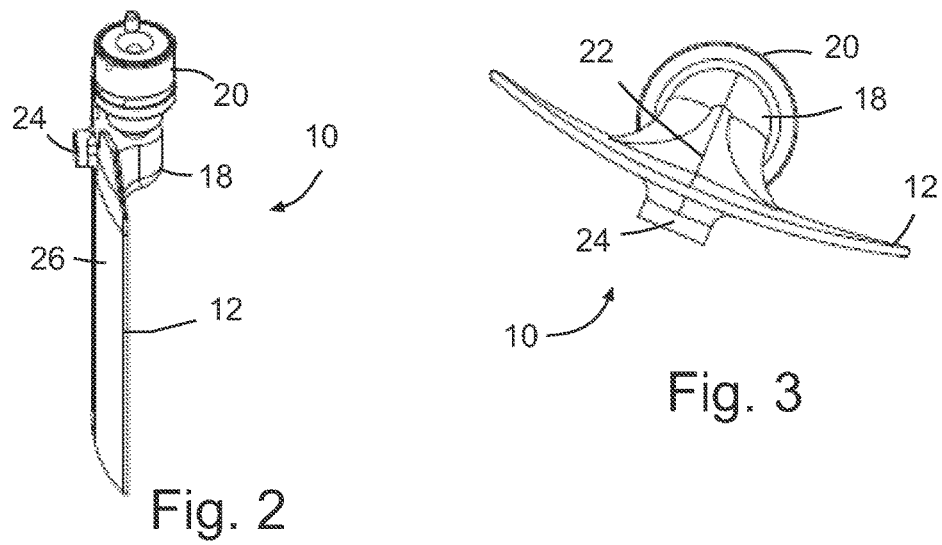
Fig. 2
Fig. 3

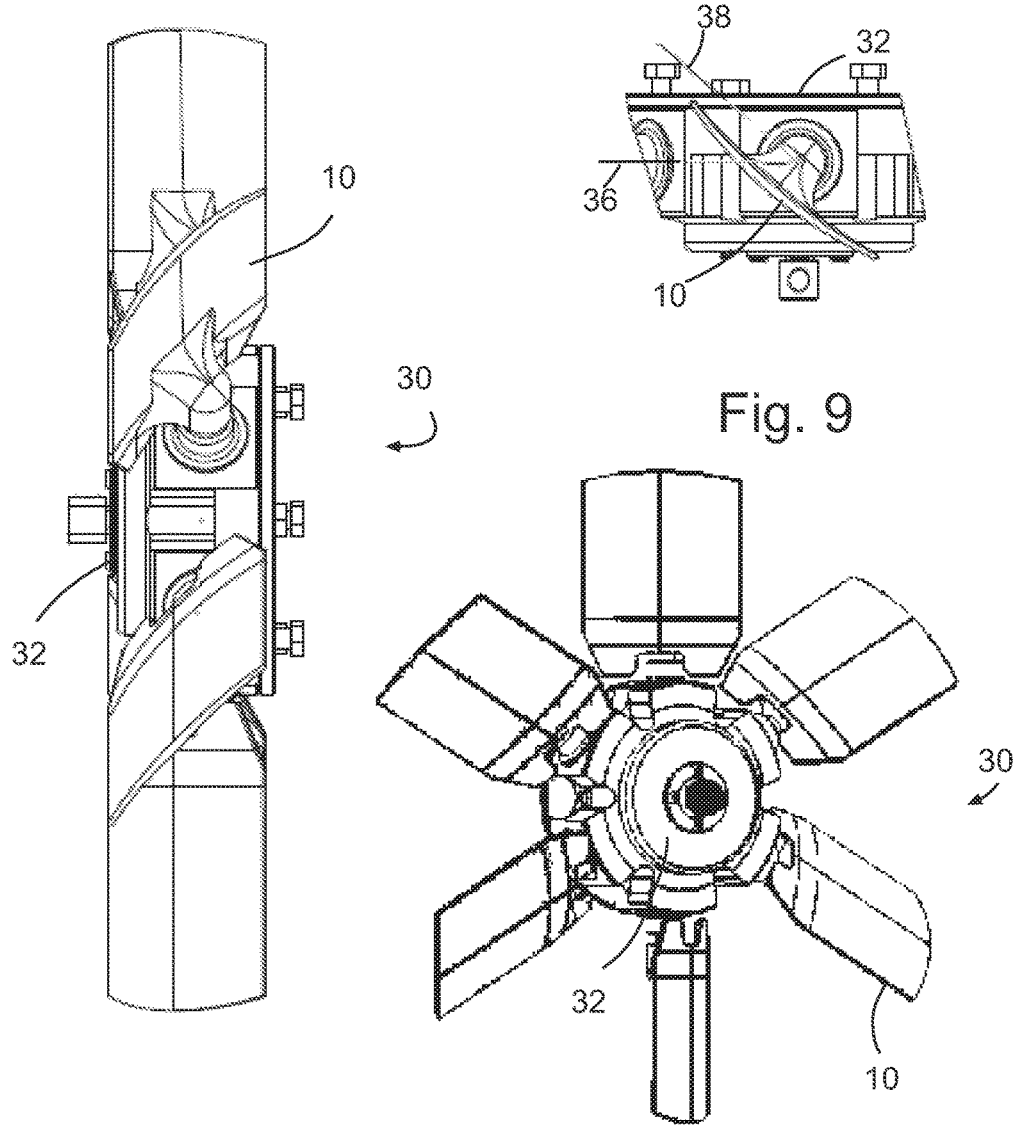

BLADE FOR A VARIABLE PITCH FAN

This application claims benefit of Provisional Application Ser. No. 62/215,711, filed Sep. 8, 2015 and entitled "Blade for a Variable Pitch Fan", the entire disclosure of which is incorporated herein by this reference.

TECHNICAL FIELD

Fan blades for variable pitch fans.

BACKGROUND

A pitching torque is created by a spinning a fan blade/propeller due to centrifugal effects. This torque occurs because blades tend to have more mass spread on one axis than on the other axis because they are relatively flat. This torque varies with the mass, the shape of the blade the square of the rpm, and the pitch of the blades. For variable pitch fans this pitching torque can add significant load onto pitching mechanisms so ways to reduce the torque can be a particularly big benefit for variable pitch fans.

One solution is to use counterweights. By distributing mass in a plane perpendicular to the cord of the blade, you create an opposing torque. This can be used to reduce the centrifugal pitching torque, or if enough mass is placed perpendicular to the chord length you can fully balance and eliminate the centrifugal pitching torque altogether.

The problem with the counterweight solution is that counterweights increase the overall weight of the fan. And in some situation, a light weight fan is necessary so as not to overload the fan drive mechanism. Therefore a goal of reducing the pitching torque with less increase of the weight of the fan was sought.

SUMMARY

There is provided a fan blade comprising a shaft defining a pitching axis of rotation of the fan blade, and a blade extending from the shaft, the blade having a blade mass and the blade defining a blade shape and a center of mass, and the blade being positioned relative to the shaft such that the center of mass is sufficiently offset from the pitching axis of rotation that the pitching torque of the fan blade about the pitching axis of rotation is at least less than 90% of the pitching torque of a blade having the same blade mass and defining the same blade shape and center of mass but positioned relative to the shaft such that the center of mass is not offset from the pitching axis of rotation.

In a further embodiment there is provided a fan blade arranged to vary in pitch about a pitching axis for a variable pitch fan, the fan blade comprising a shaft, an air moving surface extending from the shaft, the fan blade in operation experiencing a centrifugal pitching torque about the pitching axis, and the air moving surface of the fan blade being offset from the pitching axis to provide an operational reduction of the centrifugal pitching torque of the fan blade by comparison to the centrifugal pitching torque of the fan blade when the fan blade is centered on the pitching axis.

In a still further embodiment there is provided a fan blade arranged to vary in pitch about a pitching axis for a variable pitch fan, the fan blade comprising a shaft, an air moving surface extending from the shaft, the fan blade in operation experiencing a centrifugal pitching torque about the pitching axis, and the air moving surface of the fan blade being offset from the pitching axis to provide a torque opposite to the centrifugal pitching torque.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is an isometric view showing an example fan blade;

FIG. 2 is an isometric view of the fan blade of FIG. 1 from a different angle;

FIG. 3 is an end view of the fan blade of FIG. 1;

FIG. 8 is a partial cutaway view of the fan of FIG. 7;

FIG. 9 is an end view of a fan blade of FIG. 7 and an adjacent portion of the hub of the fan of FIG. 7;

FIG. 10 is a perspective view of the fan of FIG. 7;

DETAILED DESCRIPTION

Figure 4:
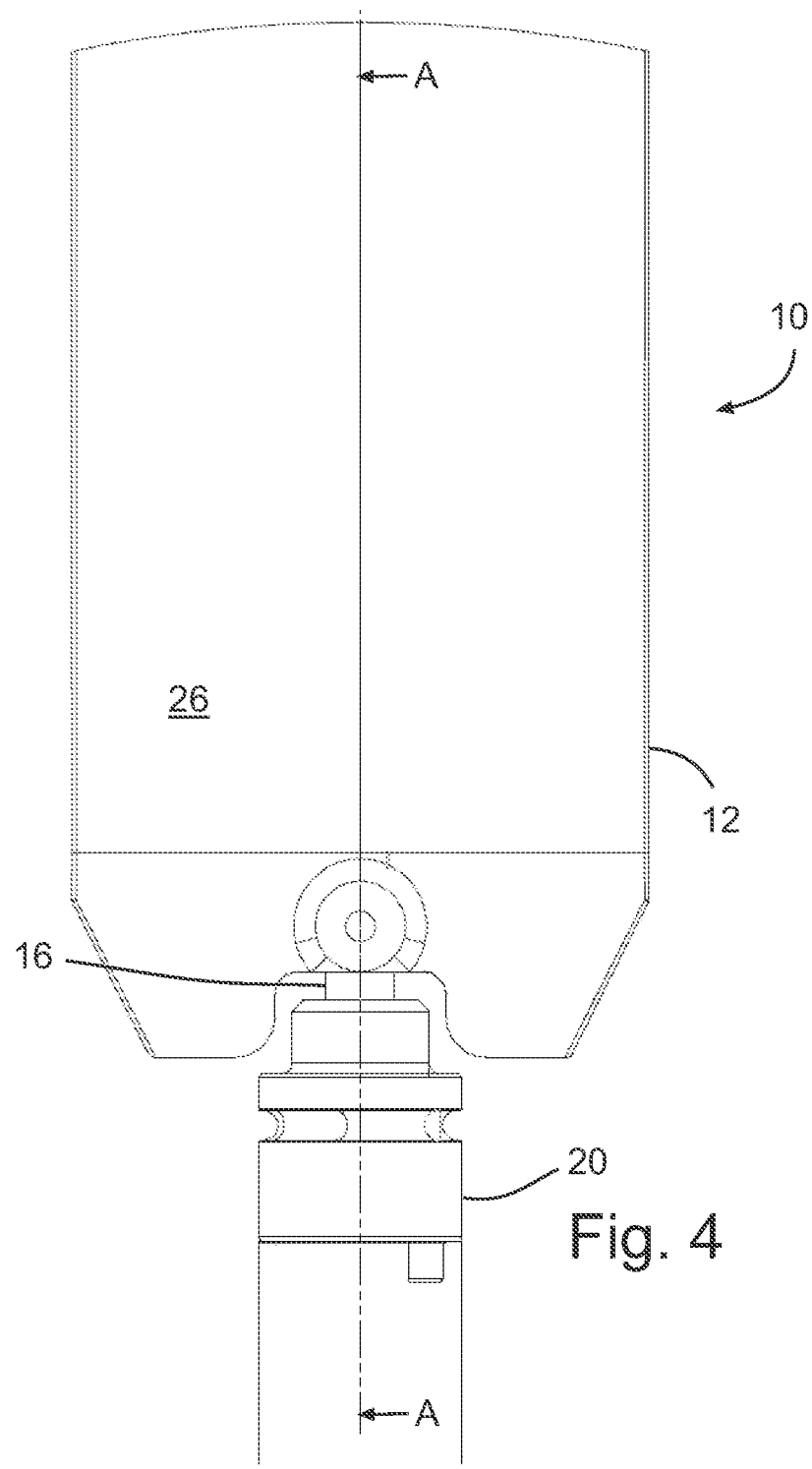
FIG. 4 is a view of the fan blade of FIG. 1 from a direction facing the outer air moving surface of the fan blade.

A fan blade is provided that is mounted so as to shift the fan blade off of the pitching axis. In this way, the blade itself acts as its own counterweight. By varying the offset, the centrifugal pitching torque may be reduced or even eliminated. A fan blade can also be used in conjunction with counterweights, where the offset reduces the size of the counterweights needed thereby reducing fan weight.

Normally blades are not perfectly centered on the axis of rotation, so there is always a slight counter torque generated, but this is usually very nominal as the effect varies with the square of the offset distance, and blades are typically very close to centered. Moving the blade off the center of rotation causes a counter torque opposite to the centrifugal pitching torque, which becomes quite noticeable with increasing offset. A counter torque of 10% of the centrifugal pitching torque is a reasonable threshold to indicate an intentional use of the blade as counterweight solution. In an implementation, moving the blades off the axis of rotation has reduced the pitching torque by 30%.

FIG. 1 shows an example fan blade 10. The example fan blade 10 comprises an airfoil 12 which defines an inner air moving surface 14, a shaft 16 and a connector 18 that connects airfoil 12 to shaft 16. Connector 18 in the embodiment shown is contiguously formed as a single unit with airfoil 12. Shaft 16 is rotatable to adjust the pitch of the blade by pitching mechanism 20. Fan blade 10 has a center of mass approximately indicated by reference numeral 22. To avoid confusion, this position is not in this embodiment on a surface of the fan blade. For embodiments having a pitching mechanism, the fan blade is defined, for the purpose of e.g. defining the center of mass of the fan blade, as the elements that are rotated by the pitching mechanism in use of the pitching mechanism, except for explicit counterweight elements. A mount post for such a counterweight element is shown in FIG. 1 as indicated by reference numeral 24.

Figures 5, 6:
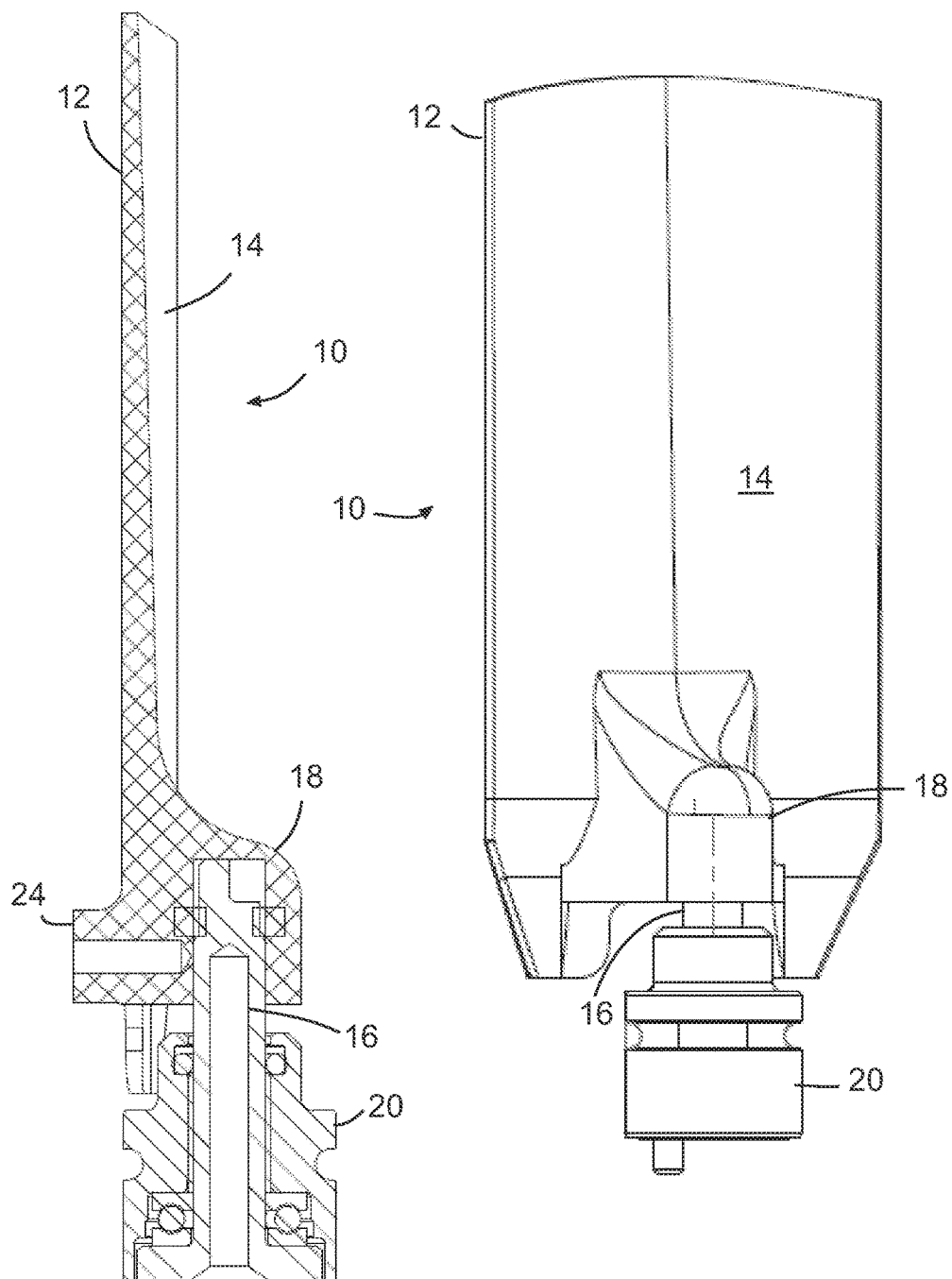
FIG. 5 is a cutaway view of the fan blade of FIG. 1 using a cut line shown in FIG. 4.
FIG. 6 is another perspective view of the fan blade of FIG. 1.

FIG. 2 shows the fan blade of FIG. 1 from a slightly different angle. The airfoil 12 defines an outer air moving surface 26 which is visible in FIG. 2. This outer air moving surface does not face the airflow in normal forward use of the fan in this embodiment but could face airflow if the blades are pitched to reverse the direction of the fan. FIG. 3 shows an end view of the same embodiment. FIG. 4 shows a view of the same embodiment from a direction facing the outer air moving surface 26. Line A in FIG. 4 shows the cut line for which FIG. 5 shows a cutaway view. FIG. 6 shows another perspective view of the same embodiment.

Figure 7:
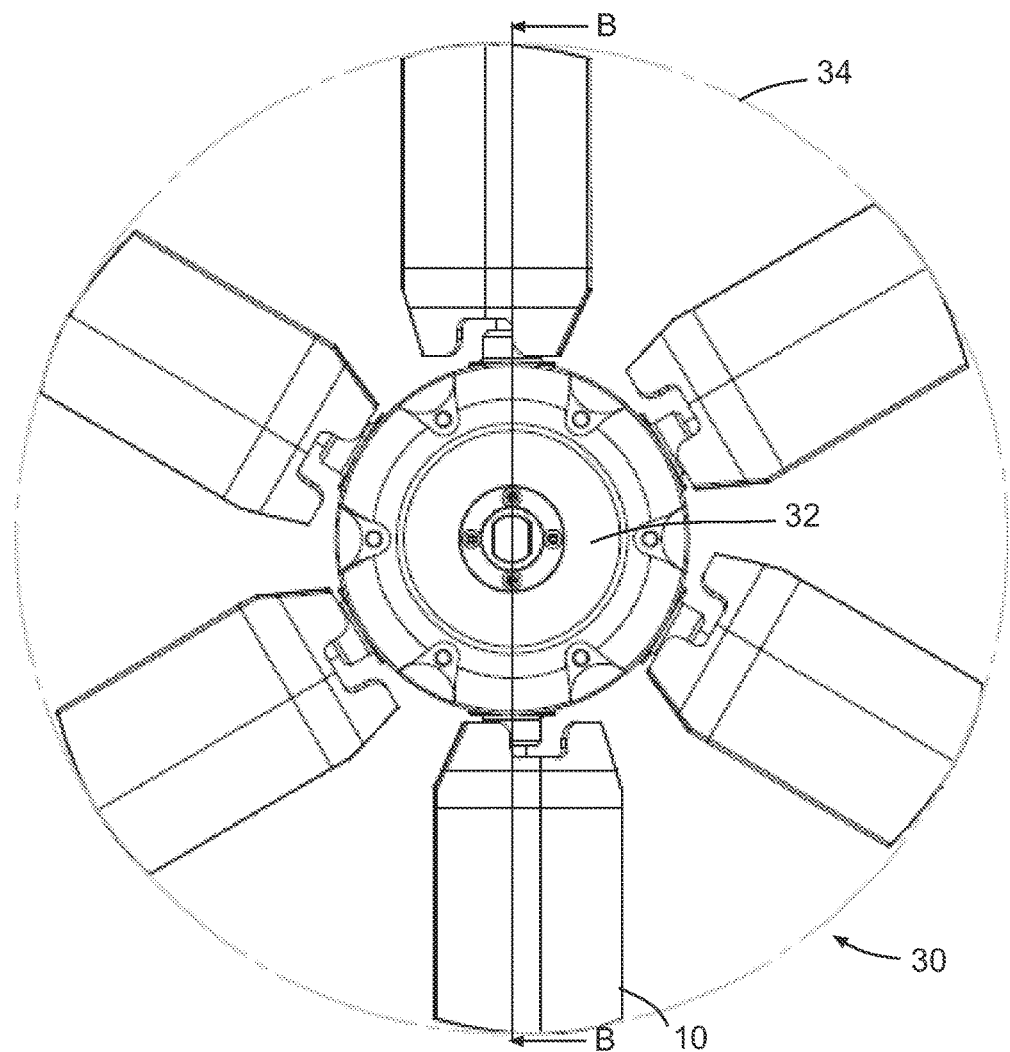
FIG. 7 is an axial view of a fan comprising offset fan blades.
Figure 11A:
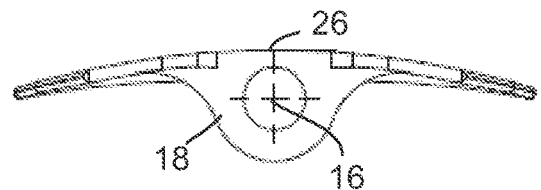
FIGS. 11A-11F are respective cutaway views of fan blades with different offsets.
Figure 11B:
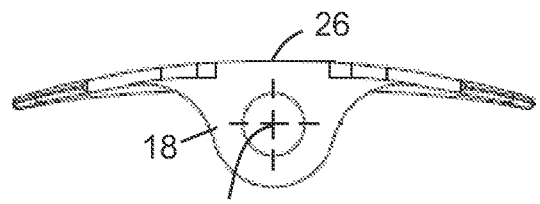
Figure 11C:
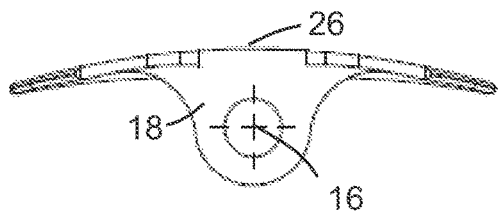
Figure 11D:
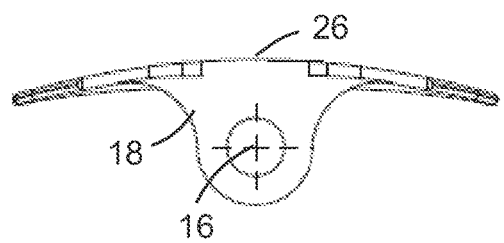
Figure 11E:
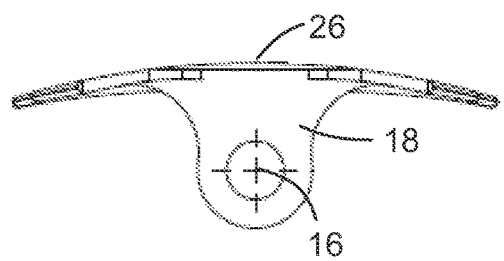
Figure 11F:
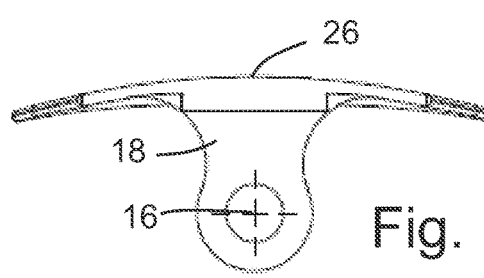
Figure 12:
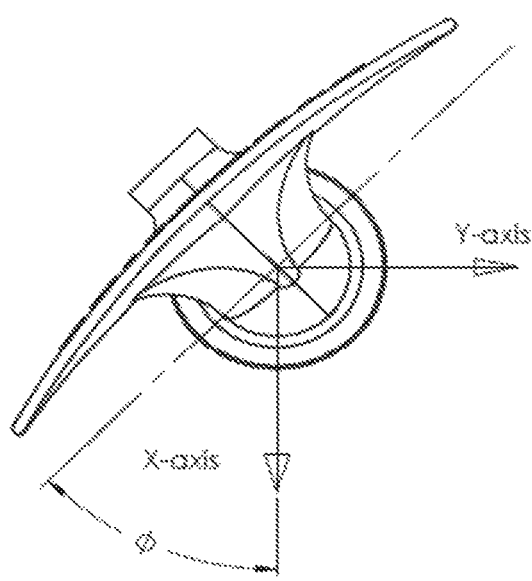
FIG. 12 shows axes for calculating a counter torque.

FIG. 7 shows a fan 30 comprising fan blades 10 arranged around a fan hub 32, Line B in FIG. 7 indicates the cut line for which FIG. 8 shows a partial cutaway view (FIG. 8 really is just a side view of the fan, so Line B is not actually a cut line for FIG. 8). A bounding circle 34 indicates the rotation of the fan blades about an axis defined by the hub. Fan blades 10 in FIG. 7-10 are a different embodiment from the fan blade 10 shown in FIGS. 1-6 and do not have counterweight (mount post) 24. FIG. 9 shows an end view of a fan blade 10 and the hub 32 behind it. Lines 36 and 38 define and illustrate the pitch angle of the fan blade 10, which is variable in this embodiment but 40 degrees as shown in FIG. 9. 40 degrees is also the default pitch angle and purge pitch angle in the embodiment shown in FIGS. 7-10. FIG. 10 shows a perspective view of the fan.

Different embodiments may have different offsets. FIGS. 11A-11F show cutaway views of multiple fan blade embodiments with different offsets. The distances from the shaft centers of shafts 16 to the outer air moving surfaces 26 shown in FIGS. 11A-11F are respectively 9.20, 12.20, 16.20, 17.95, 22.20 and 28.20 mm. Neglecting aerodynamic effects, the pitching torque is influenced by the inertial tensor component $I_{xy}$ calculated at 45 degrees pitch, where x and y are axes parallel and perpendicular to the chord respectively and passing through the blade axis (see FIG. 13), according to the equation $T=I_{xy}*\sin(2\emptyset)*\omega^2$ where T is the resulting pitching torque, $\phi$ is the pitching angle of the blade defined relative to the axes x and y and $\omega$ is angular velocity of the blade about the fan hub.

Alternatively, if we want to remove $\sin(2\emptyset)$ the statement can be re-written as follows. Neglecting aerodynamic effects, the pitching torque is influenced by inertial tensor component $I_{xy}$, where x and why are axes parallel and perpendicular to the chord of the blade at neutral pitch, $\emptyset=0$, respectively and passing through the blade axis, according to the equation $T=I_{xy}*\omega^2$ where T is the resulting pitching torque and $\omega$ is angular velocity of the blade about the fan hub.

In other words:

Rather than having the X and Y axis aligned with the blade, X and Y are aligned with the blade at neutral pitch, and centered on the axis of blade rotation.

Ixy at neutral pitch is typically 0 (no net torque generated).

The basic equation is $T=I_{xy}*\omega^2$ where Ixy is calculated at a specific pitch: and you would then get the torque at that pitch.

A slightly more complicated equation can be used which allows you to calculate the pitch torque at any angle without having to re-calculate the specific Ixy. This formula relies on Ixy (max) which is Ixy at 45 degrees. Then the formula is $T=I_{xy}*\sin(2\emptyset)*\omega^2$ where the Ixy in this equation is Ixy max or Ixy for $\emptyset=45$.

The $I_{xy}$ for the fan blades shown in FIGS. 11A to 11F are respectively 26258 gm², 24647 gm², 21303 gm², 19272 gm², 13024 gm², and 1221 gm².

A fan blade as disclosed has particular utility when used in a variable pitch fan on a diesel engine that powers industrial, transport and agricultural equipment since the variable pitch fan may be made more compact and lighter weight than when using counterweights separate from the fan blade.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A fan blade extending from a fan hub of a variable pitch fan of a diesel engine, the fan blade comprising:
    a shaft defining a pitching axis of rotation of the fan blade, and a single blade extending from the shaft, the blade having a blade mass and the blade defining a blade shape and a centre of mass; and
    the blade being positioned relative to the shaft such that the centre of mass is sufficiently offset from the pitching axis of rotation that a pitching torque of the fan blade about the pitching axis of rotation is less than 90% of the pitching torque of a blade having the same blade mass and defining the same blade shape and centre of mass but positioned relative to the shaft such that the centre of mass is not offset from the pitching axis of rotation.

2. A fan blade arranged to vary in pitch about a pitching axis on a fan hub of a variable pitch fan of a diesel engine, the fan blade comprising:
    a shaft;
    a single blade extending from the shaft having an air moving surface;
    the fan blade in operation experiencing a centrifugal pitching torque about the pitching axis; and
    the air moving surface of the fan blade being offset from the pitching axis to provide an operational reduction of the centrifugal pitching torque of the fan blade by comparison to the centrifugal pitching torque of the fan blade when the fan blade is centered on the pitching axis.

3. A fan blade arranged to vary in pitch about a pitching axis on a fan hub of a variable pitch fan of a diesel engine, the fan blade comprising:
    a shaft;
    a single blade extending from the shaft having an air moving surface;
    the fan blade in operation experiencing a centrifugal pitching torque about the pitching axis; and
    the air moving surface of the fan blade being offset from the pitching axis to provide a torque opposite to the centrifugal pitching torque.

* * * * *